United States Patent [19]

Katsuta et al.

[11] Patent Number: 4,853,792
[45] Date of Patent: Aug. 1, 1989

[54] IMAGE SIGNAL BINARY ENCODER

[75] Inventors: Yuji Katsuta; Hiroshi Kamata, both of Nara, Japan

[73] Assignee: Sharp Kabushiki Kaisha, Osaka, Japan

[21] Appl. No.: 273,629

[22] Filed: Nov. 17, 1988

Related U.S. Application Data

[63] Continuation of Ser. No. 10,705, Feb. 4, 1987, abandoned.

[51] Int. Cl.⁴ .............................................. H04N 1/40
[52] U.S. Cl. .................................... 358/455; 358/464; 382/52
[58] Field of Search ................... 358/282, 283; 382/52

[56] References Cited

U.S. PATENT DOCUMENTS

| | | | |
|---|---|---|---|
| 4,710,822 | 12/1987 | Matsunawa | 358/282 |
| 4,722,008 | 1/1988 | Ibaraki | 358/282 |
| 4,723,173 | 2/1988 | Tanioka | 358/282 |
| 4,729,035 | 3/1988 | Tanioka | 358/282 |

Primary Examiner—Howard W. Britton
Attorney, Agent, or Firm—Flehr, Hohbach, Test, Albritton & Herbert

[57] ABSTRACT

An image signal binary encoder converts a document image photoelectrically into analog signals and then into digital image signals by an analog-to-digital converter. A small area is considered around each point of interest and the average density value of the area is compared with the density value of the point of interest. A choice is made between an ordinary binary conversion method and a dither method according to the result of this comparison.

12 Claims, 5 Drawing Sheets

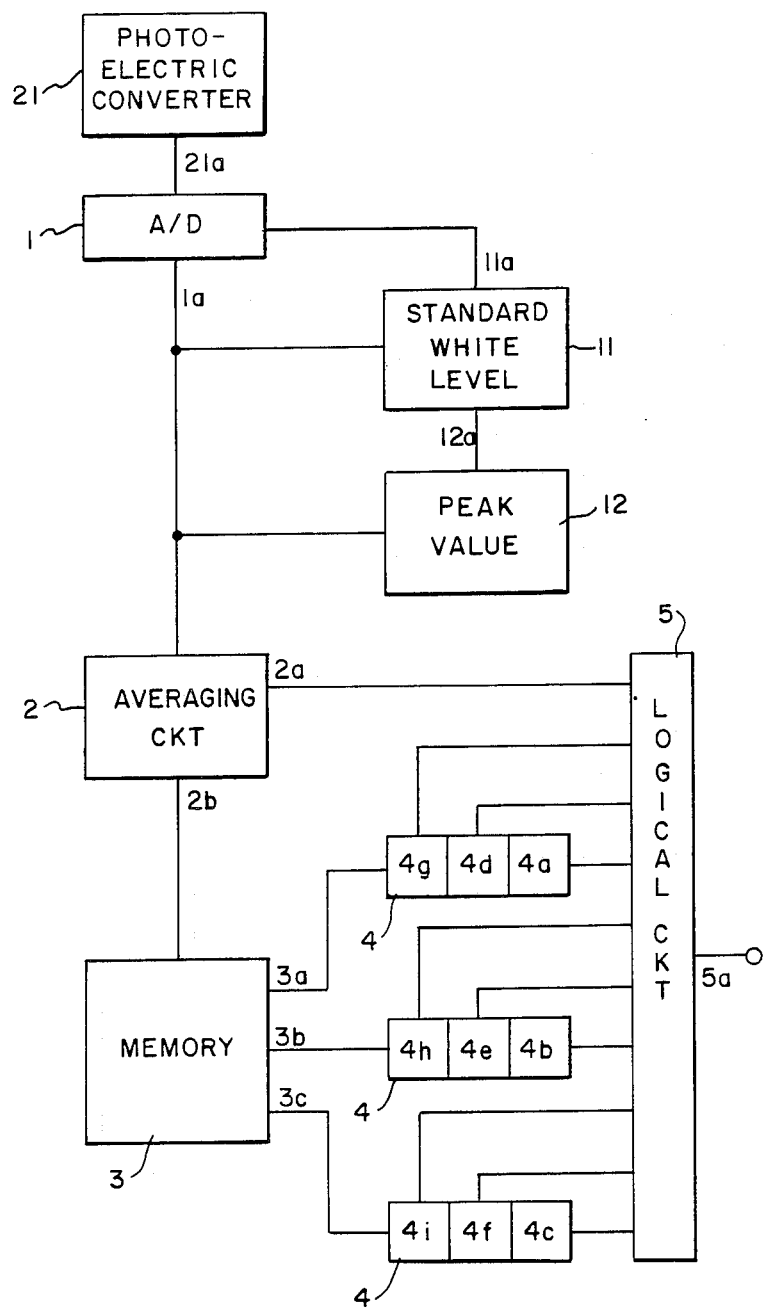
FIG.—1

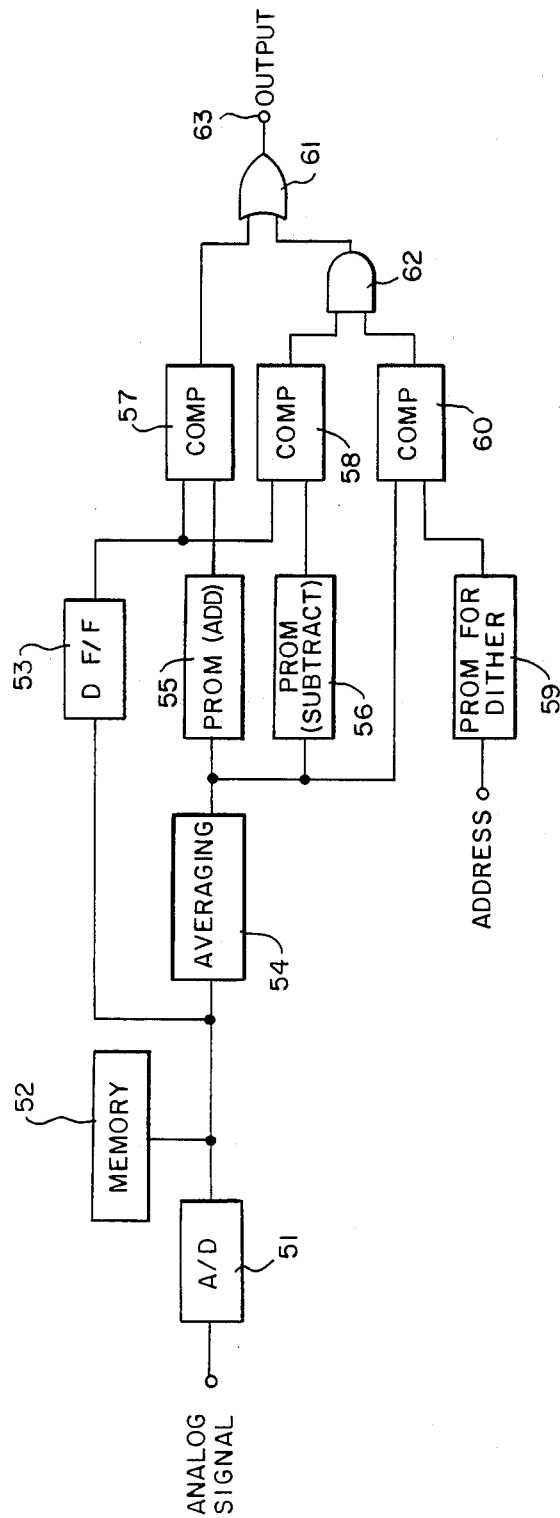
FIG.—3

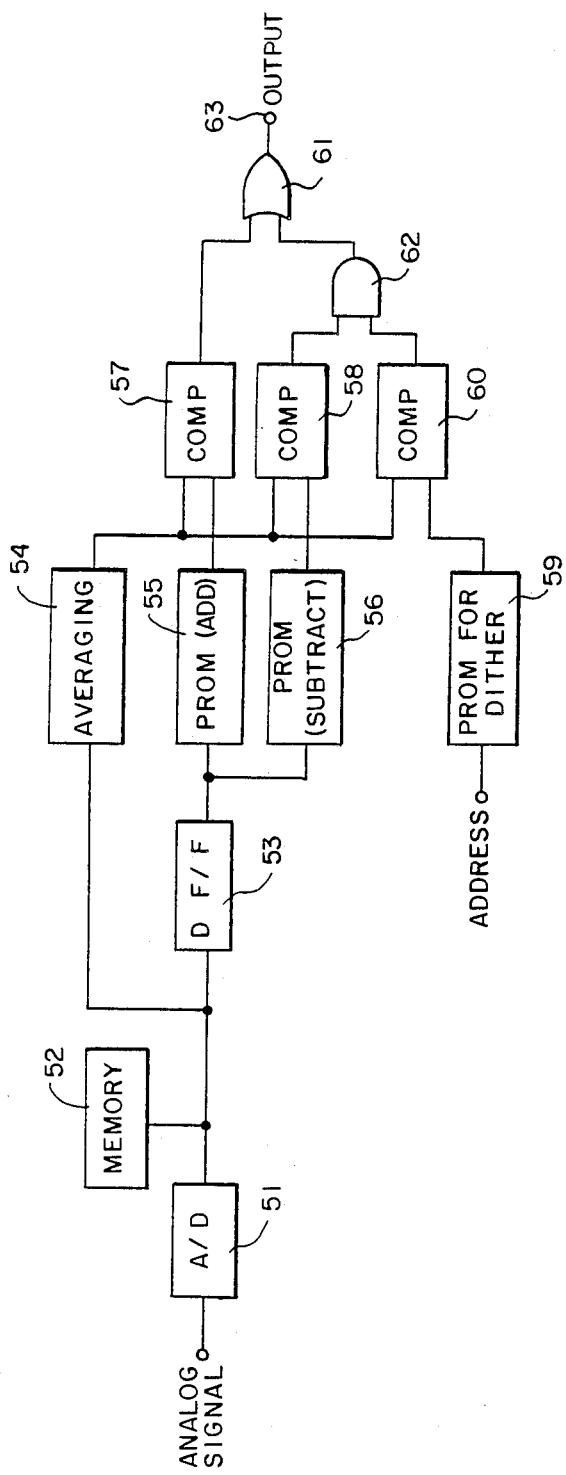
FIG.—4
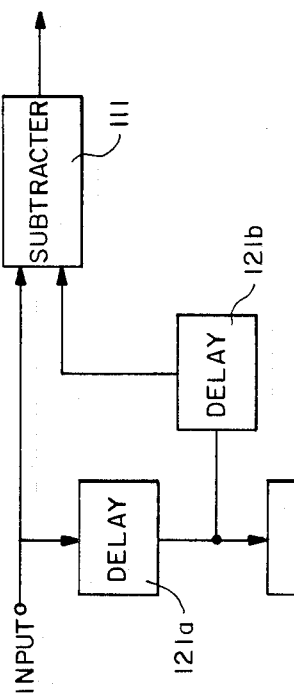
FIG.—6

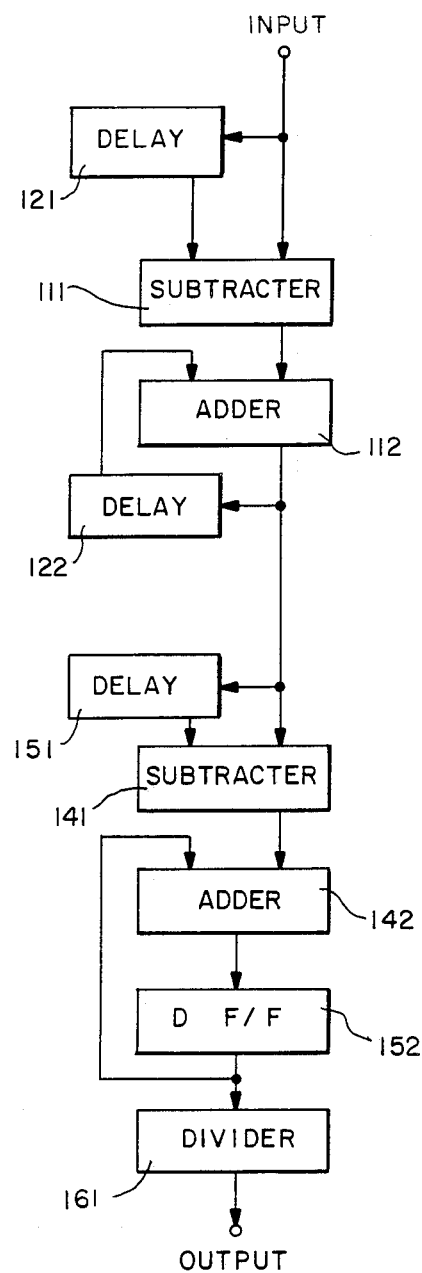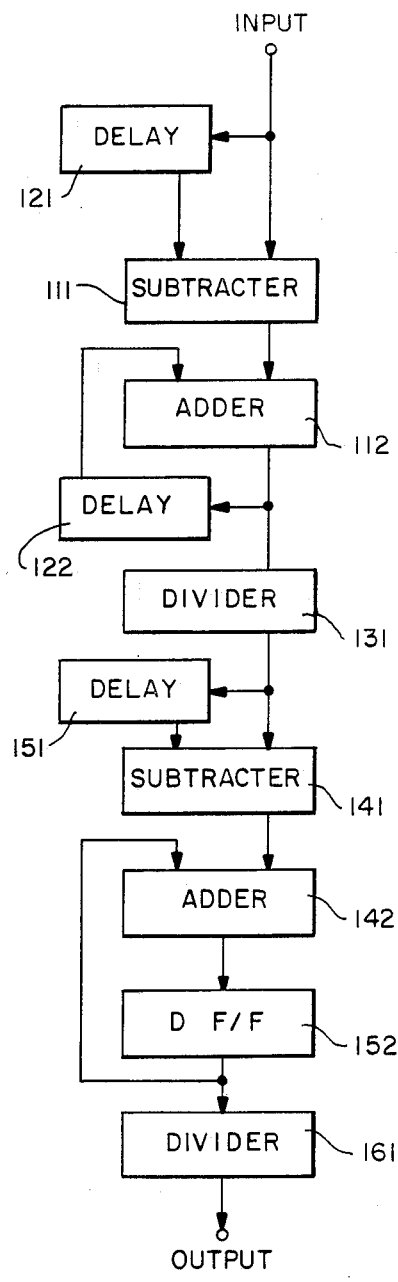
FIG.—5  FIG.—7

IMAGE SIGNAL BINARY ENCODER

This a continuation, division, of application Ser. No. 010,705 filed Feb. 4, 1987 now abandoned.

BACKGROUND OF THE INVENTION

This invention relates to an image signal binary encoder which converts analog image signals into binary output signals.

Suppose it is desired to represent the image of an original document by using only two values such as black and white. In the case of an image of characters, for example, a so-called binary encoding method can be used with reference to a certain predetermined threshold value. In the case of an image with multilevel shading such as a photograph, the so-called dither method is used with a plurality of threshold values. In the case of a document with both sections with multilevel shading such as photographs and black-and-white sections having characters and the like, if the dither method is used, the characters sometimes become difficult to read while, if such a document is converted into binary image signals, the sections with multilevel shading become totally unidentifiable. When an image is scanned by an optical means, furthermore, the image quality is affected by the background density (darkness) of the original document.

SUMMARY OF THE INVENTION

It is therefore an object of the present invention to provide an image signal binary encoder capable of effectively converting into binary image signals both multilevel sections with varied shading and black-and-white sections within a single original document.

The above and other objects are achieved by an image signal binary encoder of the present invention which converts the density of a document image photoelectrically into electrical analog signals and further into digital image signals by an analog-to-digital converter and selects for each point of interest whether an ordinary binary conversion method or a dither method is used by considering a small area around it and comparing the average density value of the area with the density value of the point of interest itself.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a schematic circuit diagram of an image signal binary encoder of the present invention, FIG. 3 is a more detailed block diagram of an image signal binary encoder embodying the present invention, FIG. 4 is a block diagram of another image signal binary encoder embodying the present invention, FIG. 5 is a block diagram of an averaging circuit embodying the present invention, FIG. 6 is a block diagram of a portion of another averaging circuit, and FIG. 7 is a block diagram of still another averaging circuit embodying the present invention.

DETAILED DESCRIPTION OF THE INVENTION

Figure 2A:
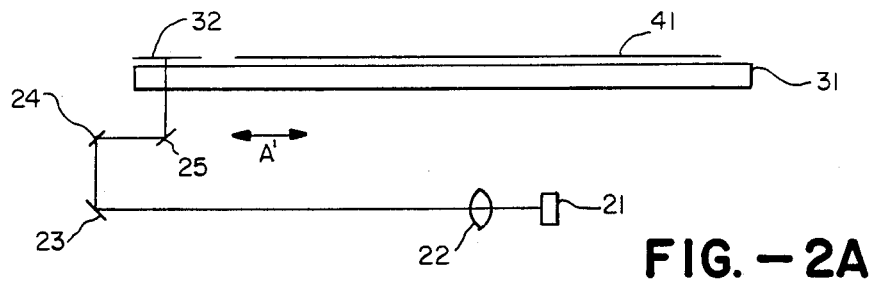
FIGS. 2A-2D are schematic drawings showing the positions of an optical system scanning an image.

One embodiment of the present invention is described below with reference to FIG. 1 which is a block diagram of an image signal binary encoder and FIGS. 2A through 2D which are schematic drawings showing its operation. In FIGS. 2A-2D, numeral 31 indicates a glass platen for carrying an original document 41. At one end section, the platen 31 is painted in white. This end section will be referred to as the standard white area 32.

The optical system of the encoder is so structured that the image of the standard white area 32 or the document 41 exposed to a light source (not shown) is formed on the light receiving surface of a photoelectric converter (one-dimensional CCD) 21 with the help of reflective mirrors 25, 24 and 23 and a lens 22. The reflective mirrors 23, 24 and 25 are movable in the direction of the arrows A. The mirror 25 moves twice as fast as the mirrors 23 and 24 such that the optical path length L remains fixed regardless of the position of the mirror 25.

The density of the standard white area 22 is determined when the mirror 25 is at the position shown in FIG. 2A. In other words, a signal 11a indicative of the fixed voltage which is to serve as the reference voltage for analog-to-digital conversion is transmitted from a standard white level detection circuit 11 of FIG. 1. An analog-to-digital converter (A/D) 1 uses this voltage as the reference voltage to convert the analog signal indicative of the density of the standard white color detected by the photoelectric converter 21 into an 8-bit digital signal 1a. The values corresponding to one line from this digital output 1a are stored by the standard white level detection circuit 11 and this completes the determination of a standard level.

Figure 2B:
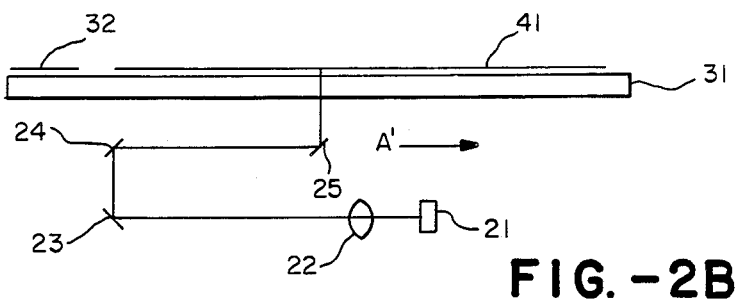

Next, the mirrors 23, 24 and 25 move in the direction of the arrow A' as shown in FIG. 2B and the document 41 is sequentially scanned. During this process, the standard white level detection circuit 11 transmits the standard white level stored therein such that effects of fluctuations and shading of the photoelectric converter 21 can be corrected in obtaining digital signals from the analog-to-digital converter 1 and binary encoding can be effected efficiently even in the case of an original document with a high-density background. Numeral 12 indicates a peak value detection circuit which serves to detect and store the peak value within a specified area of the document 41.

Figure 2C:
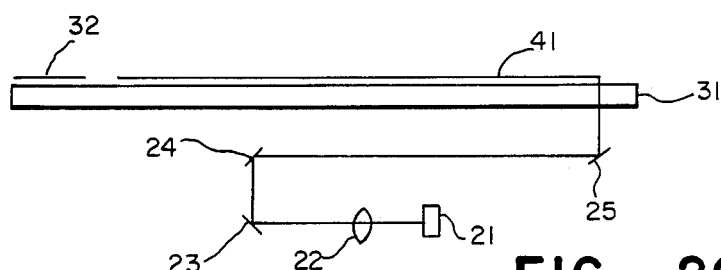

The scanning system stops when the mirror 25 moves further to the end of the document 41 as shown in FIG. 2C. At this moment, the peak value detection circuit 12 transmits a signal 12a indicative of the detected peak value. The standard white level detection circuit 11 determines the value of the standard voltage output 11a from this peak value and the stored standard white level.

Figure 2D:
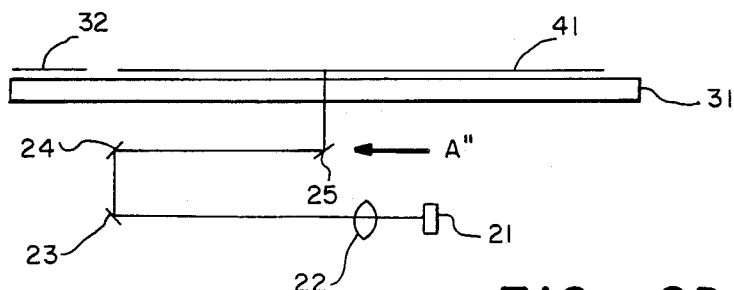

Next, the document 41 is scanned as the mirror 25 moves in the direction of the arrow A" as shown in FIG. 2D. During this process, 8-bit digital values corrected by the aforementioned peak value and standard white level are transmitted. Numeral 2 indicates an averaging circuit which calculates an average value from these digital values and other necessary values retrieved from a memory device 3 and transmits a signal 2a indicative of this average value. Thereafter, the digital values transmitted from the analog-to-digital converter 1 are stored in the memory device 3.

This average value is that of an 8×8 matrix which includes the point of interest nearly at its center, that is, at the 4th row and 4th column, and is used for the purpose of binary encoding. The memory device 3 has the capacity for eight lines. The averaging circuit 2 operates to read out data from the memory device 3 to calculate the aforementioned average value.

Transmitted from the memory device 3 are a signal 3a indicative of the values on the row which comes before the row containing the point of interest, another signal 3b indicative of the values of the row itself, and still another signal 3c indicative of the values of the next row. Numerals 4 indicate sift registers which operate to store the value at the point of interest in a memory cell 4e and the values of the surrounding points in memory cells 4a–4d and 4f–4i A logical circuit 5 including a microprocessor, ROM and RAM means receives the average value signal 2a from the averaging circuit 2 and the outputs 4a–4i from the shift registers 4 to produce a binary output 5a. In so doing, the logical circuit 5 obtains the differences between the value in the memory cell 4e corresponding to the point of interest and the values in the other cells 4a–4d and 4f–4i and decides that it is not a noise if two or more of the differences thus obtained are smaller than a specified magnitude. If the output from the memory cell 4e is determined not to be a noise and the difference between it and the average value output 2a is equal to or greater than another specified value, the binary output 5a is binary "0" or "1". In other situations, the binary output 5a is determined by the dither method, depending on the average value output 2a and the position of the point of interest.

In summary, the present invention teaches to examine whether there is a sudden change in the density in the background of the point of interest. If there is no sudden change, the dither method is use to represent the level but if there is such a sudden change, the standard binary conversion method is used such that characters and the like can be displayed clearly. Moreover, clear images can be obtained by the method of the present invention because noise is eliminated whether it originates in the document or in one of the circuits. Even if the document has a dark background, a white background color can be obtained because a peak value is detected and the reference voltage 11a of the analog-to-digital converter 1 is determined on the basis of such a peak value. An additional advantage of the method of the present invention is that an inexpensive digital memory device can be utilized because processing is done after analog signals are converted into digital signals.

Although an 8×8 matrix was considered in the above with the use of a 3×3 matrix to determine whether an output is a noise or not, it was for the sake of simplicity. The size of matrix is not intended to limit the scope of the present invention. The matrix size as well as the number of differences may be varied appropriately according to the characteristics of the image.

The structure of the logical circuit 5 is described next more in detail by way of several examples. With reference to FIG. 3 which is a block diagram showing the basic structure of the logical circuit, there is provided an analog-to-digital converter 51, as explained above, for converting an analog video signal related to a specified area of an original document image into 8-bit digital data. The larger the value of the data, the greater is the density of the original document. A memory means 52 serves to store the digital data transmitted from the analog-to-digital converter 1. Numeral 53 indicates a D flip-flop for latching the digital data of the point of interest.

According to a first example, there is an averaging circuit 34 for calculating average density which considers digital data at 15×15 points with the point of interest at the center and calculates therefrom an average density value of the points in this area. Numeral 55 indicates a PROM for performing addition. When an average density value is received from the averaging circuit 54, this PROM 55 operates to add a specified value thereto, transmitting the sum as its output. Numeral 56 indicates a different PROM for performing subtraction. When an average density value is received from the averaging circuit 54, this PROM 56 operates to subtract a specified value therefrom, transmitting the difference as its output.

A first comparator 57 serves to compare the value stored in the D flip-flop 53 and the output from the PROM 55 for addition, transmitting "1" as its output if the value stored in the D flip-flop 53 is greater than that from the PROM 55. A second comparator 58 similarly serves to compare the value stored in the D flip-flop 53 and the output from the PROM 56 for subtraction, transmitting "1" if the value in the D flip-flop 53 is smaller than the output from the PROM 56 and "0" if it is the other way around.

Numeral 59 indicates a PROM for dither operation, using 2 bits of the input address signal for selecting a dither type and the remaining 6 bits to select a point in an 8×8 dither pattern. A third comparator 60 serves to compare the output from the PROM 59 for dither operation and the average density value from the averaging circuit 54, transmitting as its output the average density encoded in binary form by the dither methods.

The output of the first comparator 57 is transmitted to an OR circuit 61. The outputs of the second comparator 58 and the third comparator 60 are transmitted to an AND circuit 62 of which the output is transmitted also to the aforementioned OR circuit 61. The output of this OR circuit 61 is transmitted to a terminal 63 of this binary encoder. Thus, the PROMs 55 and 56, the first and second comparators 57 and 58 and the OR circuit 61 may together be referred to as a first binary data generating means, and the PROM 56 which subtracts, the comparators 58 and 60, the AND circuit 62 and the PROM 59 for dither operation may together be referred to as a second binary data generating means.

If the density value at the point of interest is greater than the average density value of its neighborhood by a predetermined value, the output of the first comparator 57 is "1" and the output from the terminal 63 is also "1". Similarly, if the density value at the point of interest is smaller than the average density value of its neighborhood by a predetermined value, the outputs of the first comparator 57 and the second comparator 58 are both "0" and hence the output from the terminal 53 is also "0". In other words, when the density at the point of interest is distinctly different from the average density of its neighborhood (as in the case of a character image or the like), the output from the terminal 63 is either "1" or "0".

By contrast, if the density value at the point of interest is neither greater than the average density of its neighborhood by a predetermined value nor smaller than it by a predetermined value, the output of the first comparator 57 is "0" and that of the second comparator 58 is "1". Thus, the binary-encoded signal obtained from the average density by the dither method is transmitted to the terminal 63 through the AND circuit 62 and the OR circuit 61. In other words, if the image has multilevel shading and the density value at the point of interest is close to the average density of its neighborhood, a binary output in accordance with the average value of the neighborhood is transmitted.

The foregoing description of a preferred embodiment of the invention has been presented for purposes of illustration and description. It is not intended to be exhaustive or to limit the invention the precise form disclosed, and many modifications and variations are possible in light of the above teaching. According to a second example which is described below by way still of FIG. 3, the first PROM 5 is programmed differently such that, when an average density value is received from the averaging circuit 54 and this average density value is smaller than a predetermined value, a logarithmic addition is carried out on this average value, that is, this average value is multiplied by a predetermined number greater than 1. If this average value is greater than a predetermined value, however, "255" is transmitted as its output. Similarly, when this average density value from the averaging circuit 54 is greater than a value predetermined for the second PROM 56 for subtraction, a logarithmic subtraction is carried out, that is, this average value is multiplied by a number smaller than 1 and the product thus obtained is transmitted as its output. If this average value is smaller than a predetermined value, another predetermined value is transmitted as its output. As explained above, the first comparator 57 transmits "1" if the value stored in the D flip-flop 53 is greater than the output from the PROM 55 and "0" if it is the other way around. The AND circuit 62 and the OR circuit 61 function as explained above in connection with the previous example.

The second example of the present invention described above may also be further modified within the scope of the present invention. For example, the size of the area around the point of interest from which an average value is computed need not be 15×15. An area of 7×7 is acceptable. An area of 8×8 with the point of interest located slightly off the center thereof may also be used to produce a similar result. Moreover, the density value at the point of interest itself may be excluded in the calculation of the average value by the averaging circuit 54. This variation has the advantage of preventing the density value at the point of interest from influencing the average value of its neighborhood and hence binary encoding can be achieved more accurately.

According to a third example, addition and subtraction (inclusive of logarithmic addition and subtraction as explained above) are effected on the density value at the point of interest instead of the average value. FIG. 4, wherein components which are identical or equivalent to those shown in FIG. 3 are indicated by the same numerals, is a block diagram of the logical circuit designed for such a mode of operation. Unlike the circuit structure shown in FIG. 3, the PROM 55 for addition is connected to receive a digital data value representing the point of interest as address data from the D flip-flop 53 and then adds a predetermined number. Similarly, the PROM 56 for subtraction receives a digital data value representing the point of interest from the D flip-flop 53 and then subtracts therefrom a predetermined number. The first comparator 57 thus compares the output average density value from the averaging circuit 54 and the output from the PROM 55 which adds. Likewise, the second comparator 58 compares the output average density value from the averaging circuit 54 and the output from the PROM 56 which subtracts. These comparators 57 and 58 transmit "0" and "1" as explained above by way of FIG. 3 in connection with the first example. Further modifications and variations of the examples disclosed above are still within the scope of the present invention. The predetermined numbers added to and subtracted from or multiplying the output value from the D flip-flop 53 or the averaging circuit 54 may be fixed or adjustable according to either the density value at the point of interest or the average value. The so-called average value may be a weighed average such that the weight factors are adjustable according to the quality of the input image. The dither operation described above may be performed by referencing the density value of the point of interest instead of the average value obtained by any of the many methods described above because, according to the present invention, the average value and the density value at the point of interest are not far apart when the dither method is selected. In short, the disclosure of the present invention given above should be interpreted as broadly as reasonable.

In another aspect of the present invention, improved methods of calculating the average value are disclosed. In order to speedily obtain the average of values associated with many points in a given area such as points in an n×m matrix, it is a common procedure to operate a large number of adders in parallel to obtain the sum and then to divide it by the total number of points. If the total number of points is very large, however, the required number of adders also becomes large, and this adds to the total cost of the apparatus.

Let us consider the averaging of mn values $x_{ij}$ where i varies from i to i−n+1 and j varies from j to j−m+1. According to a first method of averaging, the sum $s_{i,j}$ of m values from $x_{i,j}$ to $x_{i,j-m+1}$ is calculated by $$s_{i,j} = s_{i,j-1} + x_{i,j} - x_{i,j-m}$$

and the sum $S_{i,j}$ of n values from $s_{i,j}$ to $s_{i-n+1,j}$ by $$S_{i,j} = S_{i-1,j} + s_{i,j} - s_{i-n,j}$$

The desired average is obtained by dividing $S_{i,j}$ by mn.

FIG. 5 is a block diagram of a circuit for calculating an average by the method described above. Let us assume that the input data are 8-bit digital data with 4096 bytes per line and that the area of interest contains points in 8 rows and 8 columns. In FIG. 5, numeral 121 indicates a delay circuit, say, of 32K-byte memory for a delay by 8 lines and its output is subtracted from the input data by a subtractor 111. Numeral 112 indicates an adder for adding the output of the subtractor 111 and an output from a delay circuit 122, say, of a 11×4K-bit memory which serves to delay the output from the adder 112 by one line. The output from the adder 112 is a sum of eight 8-bit data and comprises 11 bits.

Numeral 141 indicates another subtractor for subtracting from the output of the adder 112 the output of a delay circuit 151 for delaying the output from the adder 112 by eight data. Numeral 142 is an adder for adding the latched output of the output data of the adder 142 by a D flip-flop 152 and the output of the delay circuit 141. The output from the D flip-flop 152 is a 14-bit sum of eight 11-bit output data from the adder 112. Numeral 161 is a divider for dividing the 14-bit output from the D flip-flop by 64. Since 64 is an integral power of 2, the divider can be of a simple structure whereby only the top 8 bits of the 14-bit input are transmitted.

The delay circuit 121 for delaying by eight lines may be replaced by two delay circuits 121a and 121b, each adapted for delaying by four lines, as shown in FIG. 6 wherein numeral 119 indicates still another delay circuit for delaying by three data such that the output signal to be binary-coded appears nearly at the center. The explanations given above by way of Figs. 5 and 6 are to be interpreted as exemplary and not limitative. For example, the area wherein an average is calculated may contain more or less points in a matrix formation. Although two adders and two subtractors are shown in FIG. 5, the actual number of these components to be used can be reduced by a known time-sharing method.

FIG. 7 is a block diagram of still another averaging circuit for accepting, say, 8-bit digital data with 4096 bytes per line and calculating the average value in an area with points in, say, 8 rows and 8 columns. In FIG. 7, components which are identical or similar to those in FIG. 5 are indicated by the same numerals. FIG. 7 is different from FIG. 5 in that a divider 131 for dividing its input by 8 is inserted between the adder 112 and the subtractor 141 and that the divider 161 serves to divide its input by 8, not 64. With a circuit structured as shown in FIG. 7, therefore, the average of mn=(m=n 8 according to the example given above) values $x_{i,j}$, where i varies from i to $i-n+1$ and j varies from j to $j-m+1$, is evaluated by first calculating the sum $s_{i,j}$ of m values from $x_{i,j}$ to $x_{i,j-n+1}$ as before, obtaining the quotient $Q_{i,j}$ obtained by dividing by m the sum of n values from $s_{i,j}$ to $s_{i-n+1,j}$ by $$Q_{i,j}=Q_{i-1,j}+s_{i,j}/m-s_{i-n,j}/m$$

and finally by dividing $Q_{i,j}$ by n.

What is claimed is:

1. An image signal binary encoder for converting analog image signals into binary signals comprising
    averaging means which calculate an average density value of a specified image area near a given point of interest,
    first binary data generating means which generate a binary signal according to the size relationship between the density value at said point of interest and said average density value if said density value at said point of interest and said average density value are very different according to a predetermined criterion, and
    second binary data generating means which generate a binary signal according to said density value at said point of interest or said average density value if said density value at said point of interest and said average density value are not very different according to said predetermined criterion.

2. The image signal binary encoder of claim 1 wherein said average density value is a weighed average value with weight factors determined by the quality of image which produces said analog image signals.

3. The image signal binary encoder of claim 1 wherein said specified image area includes said point of interest.

4. The image signal binary encoder of claim 1 wherein said density value at said point of interest and said average density value are very different according to said criterion if said density value at said point of interest is larger than said average density value at least by a first factor larger than 1 or said density value at said point of interest is smaller than said average density value at least by a second factor smaller than 1, and said density value at said point of interest and said average density value are not very different according to said criterion if said density value at said point of interest is larger than said average density value by less than said first factor or said density value at said point of interest is smaller than said average density value by less than said second factor.

5. The image signal binary encoder of claim 1 wherein said second binary data generating means generate a binary signal by the dither method.

6. The image signal binary encoder of claim 1 wherein said averaging means function to calculate the average of mn values $x_{i,j}$ where $i=i,\ldots i-m+1$, $j=j,\ldots j-n+1$ and m and n are integers, by calculating subtotals $s_{i,j}$ of m values from $x_{i,j}$ to $x_{i,j-m+1}$ by $$s_{i,j}=s_{i,j-1}+x_{i,j}-x_{i,j-m}$$

and the sum $S_{i,j}$ of n values from $s_{i,j}$ to $s_{i-n+1,j}$ by $$S_{i,j}=S_{i-1,j}+s_{i,j}-s_{i-n,j}$$

and by dividing $S_{i,j}$ by mn.

7. The image signal binary encoder of claim 1 wherein said averaging means function to calculate the average of mn values $x_{i,j}$ where $i=i,\ldots i-m+1$, $j=j,\ldots j-n+1$ and m and n are integers, by calculating subtotals $s_{i,j}$ of m values from $x_{i,j}$ to $x_{i,j-m+1}$ by $$s_{i,j}=s_{i,j-1}+x_{i,j}-x_{i,j-m}$$

8. The image signal binary encoder of claim 1 wherein said density value at said point of interest and said average density value are very different according to said criterion if said density value at said point of interest is larger than said average density value at least by a first specified value or said density value at said point of interest is smaller than said average density value at least by a second specified value, and said density value at said point of interest and said average density value are not very different according to said criterion if said density value at said point of interest is larger than said average density value by less than said first specified value or said density value at said point of interest is smaller than said average density value by less than said second specified value.

9. The image signal binary encoder of claim 8 wherein said first and second specified values are the same. and the sum $Q_{i,j}$ of n values from $s_{i,j}/m$ to $s_{i-n+1,j}/m$ by $$Q_{i,j}=Q_{i-1,j}+s_{i,j}/m-s_{i-n,j}/m$$

and by dividing $Q_{i,j}$ by n.

10. An image signal binary encoder comprising
    photoelectric conversion means for converting the density of a document image into electrical analog signals,
    analog-to-digital conversion means for converting said electrical analog signals into multi-bit digital image signals,
    binary encoding means for binary-encoding said digital image signals by using either a binary method or a dither method, memory means for storing digital image signals of a plural n-number of points around and including a point of interest, averaging means for obtaining an average value of digital image signals at a plural m-number of points around and including said point of interest where m is equal to or greater than n, and control means which obtain differences of digital image signals between said point of interest and those of said n points other than said point of interest, and select said binary method if the number of said differences which are smaller than a first specified value is greater than a specified number and if the difference between the digital image signal at said point of interest and said average value is greater than a second specified value, and said dither method in other situations.

11. The image signal binary encoder of claim 10 wherein said analog-to-digital conversion means include a standard white area and a standard white storing means for storing the digital image signal obtained from said standard white area by said analog-to-digital conversion means, the value stored in said standard white storing means being adapted to be used as reference voltage for the analog-to-digital conversion by said analog-to-digital conversion means with said document image.

12. The image signal binary encoder of claim 10 wherein said analog-to-digital conversion means include peak value storing means for storing the maximum value of digital image signals when said document image is scanned, said maximum value stored in said peak value storing means being adapted to be used as reference voltage for the analog-to-digital conversion by said analog-to-digital conversion means.

* * * * *

UNITED STATES PATENT AND TRADEMARK OFFICE
CERTIFICATE OF CORRECTION

PATENT NO. : 4,853,792

DATED : August 1, 1989

INVENTOR(S) : Katsuta et al

It is certified that error appears in the above-identified patent and that said Letters Patent is hereby corrected as shown below:

Column 7, line 29, change "mn=(m=n 8)" to --mn (m=n=8)--.

Column 7, line 33, change "$x_{i,j-n+1}$" to --$x_{i,j-m+1}$--.

Claim 9, column 8, lines 51-58, delete entirety of claim and substitute therefor: --The image signal binary encoder of claim 8 wherein said first and second specified values are the same.--

Signed and Sealed this

Fourteenth Day of July, 1992

*Attest:*

DOUGLAS B. COMER

*Attesting Officer*      *Acting Commissioner of Patents and Trademarks*